United States Patent [19]

Friedrich

[11] Patent Number: 4,865,460

[45] Date of Patent: Sep. 12, 1989

[54] STATIC MIXING DEVICE

[75] Inventor: Juergen Friedrich, Conyngham, Pa.

[73] Assignee: Kama Corporation, Hazleton, Pa.

[21] Appl. No.: 188,909

[22] Filed: May 2, 1988

[51] Int. Cl.[4] ............................ B01F 5/06; B29B 1/06

[52] U.S. Cl. ...................................... 366/337; 138/42; 366/147; 366/336

[58] Field of Search ............... 366/336, 337, 338, 339, 366/340, 144, 147, 341; 138/38, 40, 42; 48/180.1, 189.6; 137/896

[56] References Cited

U.S. PATENT DOCUMENTS

| | | | |
|---|---|---|---|
| 4,049,241 | 9/1977 | Taniguchi | 366/339 |
| 4,685,514 | 8/1987 | Brown | 138/38 X |
| 4,692,030 | 9/1987 | Tauscher et al. | 366/337 |
| 4,744,928 | 5/1988 | Meier | 366/337 X |
| 4,758,098 | 7/1988 | Meyer | 366/336 X |

FOREIGN PATENT DOCUMENTS

| | | | |
|---|---|---|---|
| 8202004 | 6/1982 | PCT Int'l Appl. | 366/337 |

*Primary Examiner*—Timothy F. Simone

*Attorney, Agent, or Firm*—Dressler, Goldsmith, Shore, Sutker & Milnamow, Ltd.

[57] ABSTRACT

A static mixing device comprising a conduit in which there are located a plurality of rows of spaced parallel tubes extending across the conduit. The tubes are located in rows in which the adjacent rows extend in a longitudinal direction, but are located at right angles to each other. The heat transfer medium flows through the tubes to maintain the product in the conduit within a preselected temperature range. The adjacent rows of tubes abut each other and thus provide a tortuous path for the product in the conduit to effect mixing thereof.

6 Claims, 1 Drawing Sheet

STATIC MIXING DEVICE

BACKGROUND OF THE INVENTION

The present invention is directed to a heat exchanger and mixing device wherein material directed through a conduit, such as, a viscous resin material, is kept in flowable state by a heat transfer medium directed through tubes that extend across the conduit.

It is to be noted that there are a number of heat transfer systems currently available, including those which use tubes extending across a conduit and through which a heat transfer medium is directed for maintaining the material flowing through a conduit within the requisite temperature range. However, these systems are deficient in that they do not provide for the requisite mixing and are not as efficient a heat transfer system as the instant invention. Patents directed to this sort of general configuration are as follows: Oakeley 33,849; Fox 551,489; Holland 609,935; Holt et al. 798,183; Harter 1,636,958; Wells 2,018,163; Behlau 4,235,286; Pranaitis 4,363,353; and Muller et al. 4,314,606. It is acknowledged that these prior art references do provide for heat transfer and in some cases even enhance the mixing of a viscous material. However, unsatisfactory heat exchange between the flowable material and the heat exchange medium is achieved and the desired mixing is not obtained thus requiring a more efficient system such as the type set forth in the present invention.

SUMMARY OF THE INVENTION

The present invention overcomes the above-described deficiencies of previous systems by providing a novel heat exchange and mixing system which consists of a plurality of spaced rows of tubes located within a conduit. Each of the rows of tubes consists of a plurality of spaced parallel tubes that extend through and are welded to the exterior surface of the conduit. The adjacent rows of tubes, which while extending in a longitudinal direction, are disposed at an angle relative to the adjacent rows and thus the adjacent rows of tubes while providing for good heat transfer also provide for mixing, since the material flowing through the conduit is directed in a tortuous path around the adjacent rows of tubes.

In the preferred embodiment, the adjacent rows of tubes that extend through the outer walls of the conduit, form an angle of approximately 90° with adjacent rows of tubes. Thus, you have a situation where there are adjacent rows of tubes that criss-cross each other. With this arrangement, the tubes through which a heat transfer medium is directed act to maintain the material being directed through the conduit in a flowable condition.

In a typical situation, a product, such as, styrene, entering the conduit is introduced at a temperature of approximately 200° C. and the heat transfer medium which is a standard heat transfer oil is introduced at a temperature of approximately 300° C. The important thing is that the temperature of the heat transfer oil be sufficient to initiate and continue polymerization of the monomer flowing through the large size conduit. With this arrangement, the project flowing through the conduit is maintained at the requisite viscosity. While in the present situation it is being used for the polymerization of styrene, it could be used for other materials. The tubes are generally made of stainless steel, or some other heat-conductive material whereby the heat transfer medium being directed through the tubes acts to maintain the temperature of the resin material flowing through the conduit in a flowable condition. The tubes are quite thin, which provides for excellent heat transfer between the heat transfer oil and the product flowing through the conduit. It is noted that the adjacent rows of tubes are in close contact with each other, but since they cross each other, the tubes form a tortuous path for the product being directed through the conduit. Accordingly, all volume zones of the flowing product are kept at a close distance relative to the heat transfer surface. Thus, this arrangement not only provides for excellent heat transfer in view of the high heating area relative to the flowable material, it also provides for the material to be mixed by virtue of having to flow in a tortuous path through the conduit. In essence, excellent heat transfer is provided by continued close proximity of the hot oil to the material to be polymerized and the efficient transfer of heat to the product throughout the entire mixing device. This design eliminates the build-up of polymer of the walls of the conduit and overcomes the creating of "dead zones" in the reacting system.

Numerous other features and advantages of the present invention will become readily apparent from the foregoing detailed description of the invention, from the claims, and from the accompanying drawings, in which:

Figure 1:
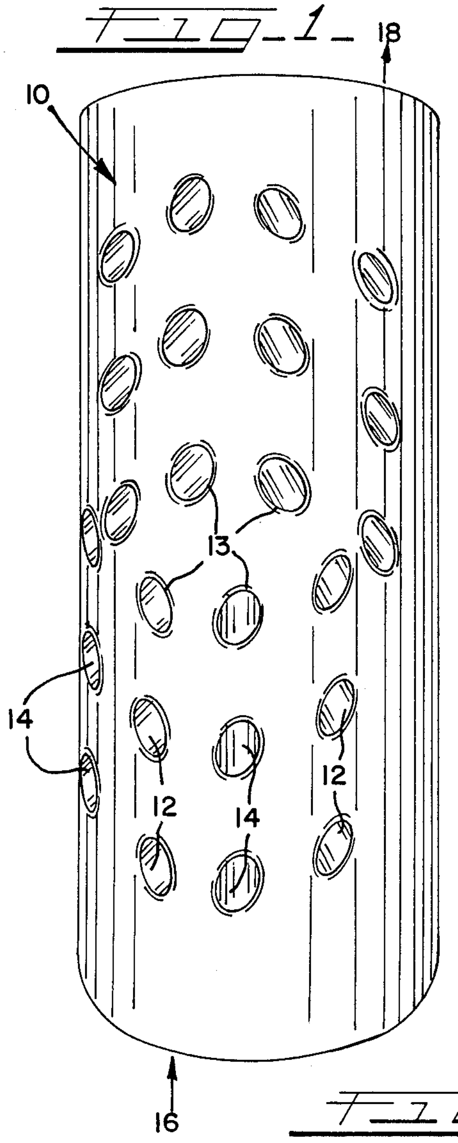
FIG. 1 is a plan view of the conduit showing the heat transfer tubes extending therethrough.
Figure 2:
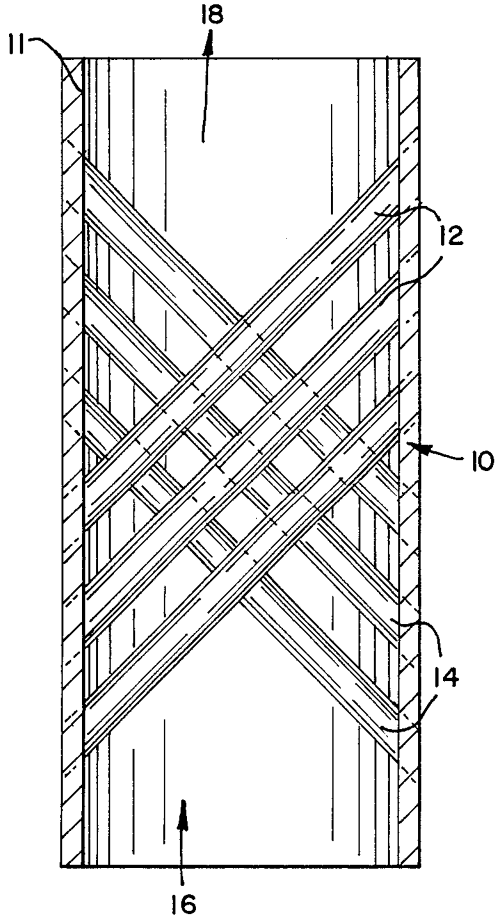
FIG. 2 is a cross-sectional view showing two adjacent rows of tubes extending through the conduit.

Referring now to FIG. 1, there is shown a conduit 10 which includes a plurality of rows of tubes 12, 14, which extend therethrough. Referring more specifically to FIG. 2, there are illustrated two adjacent rows of tubes 12, 14, which are located at approximately right angles relative to each other.

Figure 3:
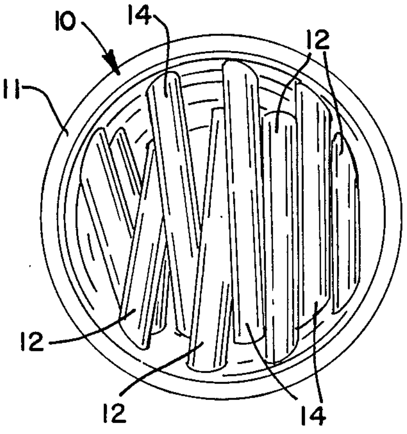
FIG. 3 is an end view of the conduit and tube assembly shown in FIG. 1.

FIG. 3, which is an end view, illustrates the conduit 10 and alternate rows of tubes 12, 14 that have the same orientation. It can be particularly seen from FIGS. 2 and 3 that flowable material introduced into the conduit at the inlet 16 will initially contact the plurality of adjacent rows of tubes 12, 14, but will not be able to move in a straight line due to the orientation of rows 12, 14. As shown in FIG. 3, the rows 12, 14 abut each other, and thus any material entering the inlet 16 has to make a number of twists and turns before it comes to the outlet 18 of the conduit 10.

The tubes 12, 14 extend through the walls 11 of the conduit 10 and are welded to the exterior of the walls at 13 as shown in FIG. 1.

With respect to FIG. 2, it is shown that the adjacent rows of tubes are located at approximately a right angle relative to each other, but it is clear that this is merely but a preferred embodiment and the degree of angularity is not essential. It is just desirable that the adjacent rows cross each other, so that there is no straight-line path for the material to flow between the inlet 16 and the outlet 18 of the conduit 10. The arrangement of the adjacent rows of tubes clearly acts to enhance the mixing desired.

Thus, it can be seen that with the aforementioned tube and conduit orientation, the maximum surface area for a given length and diameter of conduits and tubes is obtained to facilitate a highly efficient transfer of heat from the tubes to the material flowing in the conduit 10.

In an illustrative example, the material flowing into the conduit at approximately 200° C. is styrene and is to be maintained at this temperature. To accomplish this, the heat transfer medium is a standard heat transfer oil, which is introduced at 300° C., so that the heat transfer medium retains the product at the desired temperature for flowability, while at the same time creating the desired mixing required.

It is intended to cover by the following claims all modifications and embodiments which come within the true spirit and scope of the invention.

What is claimed is:

1. A static mixing device comprising a tubular conduit through which a viscous product to be maintained within a given temperature range is fed under substantial pressure, a plurality of rows of tubes extending across and filling a major portion of the cross section of said conduit through which a heat transfer medium flows to provide a greater interface between the heat transfer medium and viscous product to maintain said product within the preselected temperature range to help retain its homogeneity, each of said rows of tubes extending in a longitudinal direction relative to said conduit, the tubes in each of the rows abutting an adjacent row and extending at an angle relative to adjacent rows so that the product flowing through said conduit under high pressure is directed in a tortuous path around said tubes to effect uniform mixing of the product and prevent accumulation of the product on the tubes while the product is being maintained within the prescribed temperature range by the application of uniform heat to the viscous product to provide a more uniformly reacted viscous product flowing through the conduit.

2. A static mixing device as set forth in claim 1 in which the alternate rows of tubes are parallel to each other.

3. A static mixing device as set forth in claim 2 in which the immediately adjacent groups of tubes are disposed at right angles to each other.

4. A static mixing device as set forth in claim 1 in which the tubes extending through the conduit are welded to the outer surface of the conduit.

5. A static mixing device as set forth in claim 3 in which there are at least four groups of tubes.

6. A static mixing device as set forth in claim 1 in which said conduit has a relative small diameter whereby the flow of heat transfer medium flowing through the tubes occurs during a relatively short time span so that only a small variation of the temperature of the transfer medium takes place as it flows through the conduit.

* * * * *